Patented Nov. 16, 1926.

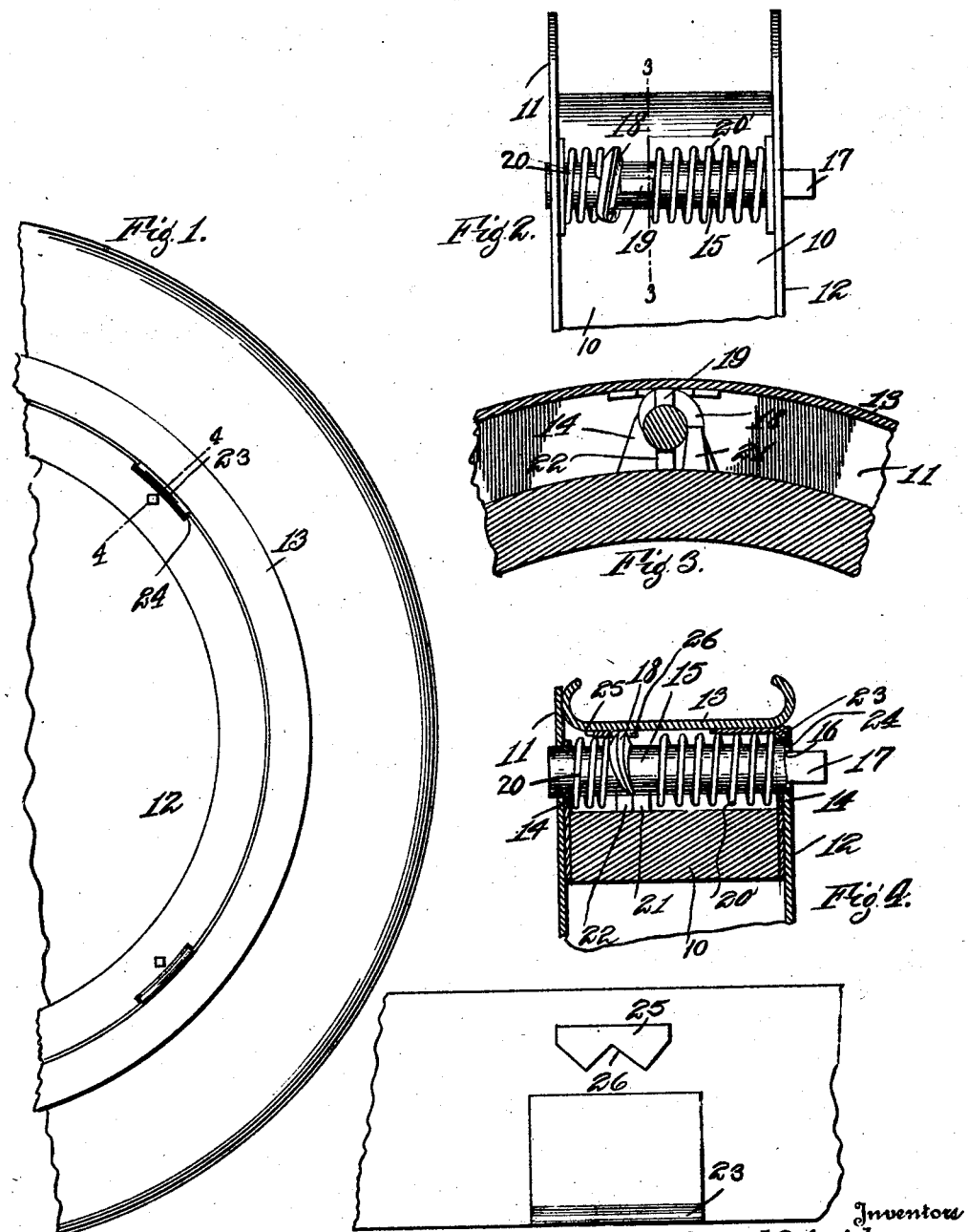

1,607,181

UNITED STATES PATENT OFFICE.

SAMUEL S. AMICK AND HERBERT L. MURPHY, OF ESPARTO, CALIFORNIA.

DEMOUNTABLE RIM.

Application filed April 22, 1925. Serial No. 25,077.

This invention relates to new and useful improvements in wheel rims, and particularly to demountable rims.

One object of the invention is to provide a device of this character which is simple in construction, and which is easy to operate whereby to greatly facilitate the operation, and decrease the time required to remove and replace the rim.

Another object is to provide a demountable rim which is secured to the felly of a wheel, in such manner that the use of clips and nuts is obviated.

Other objects and advantages will be apparent from the following description when taken in connection with the accompanying drawing.

In the drawing:

Figure 1 is a side elevation of a portion of a wheel equipped with the improved demountable rim.

Figure 2 is an elevational view at right angles to that of Figure 1, but with the rim removed.

Figure 3 is an enlarged fragmentary sectional view on the line 3—3 of Figure 2, showing the locking cam of the rim.

Figure 4 is an enlarged vertical sectional view on the line 4—4 of Figure 1, showing one of the cams in locking position.

Figure 5 is a fragmentary plan view of the inner face of the demountable rim, showing the means with which the locking cams engage.

Referring particularly to the accompanying drawings, 10 represents the felly of the wheel, which has the inner vertical flange 11, and the outer rim supporting disk 12, which latter is of smaller diameter than the flange 11, whereby to be properly received in the demountable rim 13, and to project beyond the periphery of the felly.

Secured to the opposite side faces of the felly 10 are the radially extending apertured ears 14, the ears of one face of the felly alining, transversely of the felly, with corresponding ears of the opposite face, and slidably and rotatably receiving therein the opposite ends of the shafts 15. The outer ends of the shafts 15 extend through openings 16 in the disk 12, and are provided, exteriorly of said disk, with square portions 17, for engagement by a suitable key. On the intermediate portion of each of the shafts 15, is formed a spiral cam rib 18, and opposite the intermediate portion of each rib 18 is a radially extending lug 19. Encircling each shaft, between the ears 14, and the cam 18 and lug 19, respectively, are the coil springs 20 and 20', which serve to lend friction to the shafts, whereby said shafts will remain at any point in their rotation. It will be noted that the spring 20' is longer than the spring 20, and that said spring normally urges the shaft 15 toward the left, as viewed in Figures 2 and 4, so that the cam rib will be frictionally engaged with the lug 25, to be later described. Projecting from the peripheral face of the felly are the lugs 21 and 22, the former of which is arranged to be engaged by one end of a cam rib 18, while the other is arranged to be engaged by the lug 19, the engagement of the cam with the lug 21 serving to limit the rotation of the shaft in one direction, while the engagement of the lugs 19 and 22 serve to limit the rotation of the shaft in the other direction.

The rim 13 is provided with the marginal tire engaging flanges, on its outer face, and on its inner face adjacent one edge thereof are formed the inwardly directed lugs 23, which are arranged to pass through the notches 24, formed in the periphery of the disk 12, in the application or removal of the rim. Formed on the inner face of the rim 13, adjacent the other edge thereof, are the lugs 25, and on the inner face of each of these lugs there is formed a recess 26, into which the apex of the cam rib 18 is arranged to engage, upon rotation of a shaft 15, in one direction, and which serves to properly and securely hold the rim 13 on the felly.

It will be noted that the cam ribs 18 extend partly around the shafts so that when the shafts are rotated in one direction, by a suitable key, said ribs will properly engage in the recesses 26, of the lugs 25, to hold the rim 13 in position, and when turned in the opposite direction, until the lugs 22 engage the lugs 19, the unribbed portions of the shafts will lie opposite said recesses, whereby the rim may be readily slipped from the wheel.

It will further be noted that the cam ribs engage between the lugs 25 and the inner faces of the lugs 23, thus more securely holding the rim 13 against movement in either direction transversely of the felly of the wheel. It will be noted that the ends of the cam rib 18 are spaced a sufficient distance apart to permit straddling of the lug 25, when the rim 13 is slipped onto the felly.

To remove the rim 13, it is only necessary to turn the shafts 15 until the cam ribs are out of the recesses 26, when the rim may be quickly slipped off. After the rim has been replaced on the wheel, the shafts are turned in the opposite direction to lock the rim in place.

What is claimed is:

A wheel construction comprising a felly having a peripheral flange and a disk of lesser diameter than the flange and spaced outwardly therefrom, a transverse ring adjacent the peripheries of said flange and disk, radially extending lugs on the peripheral face of the ring, the disk and flange having transversely alined openings, transverse shafts supported in said openings for rotation and reciprocation therein and each having a spiral cam rib thereon, resilient means on each of the shafts on opposite sides of the cam for urging the shafts longitudinally in said openings, a rim disposed outwardly of the shafts, and a plurality of recessed lugs on the inner face of the rim into which said cam rib is arranged to engage to maintain the rim on the wheel, said shafts being arranged to stop in one direction by contact of the rib with one of the first lugs, and a lug on the shaft for engagement with the other of said rim lugs.

In testimony whereof, we affix our signatures.

SAMUEL S. AMICK.
HERBERT L. MURPHY.